(12) United States Patent
Chatteri et al.

(10) Patent No.: US 7,861,782 B2
(45) Date of Patent: Jan. 4, 2011

(54) FOAMED CEMENT COMPOSITIONS, ADDITIVES, AND ASSOCIATED METHODS

(75) Inventors: Jiten Chatteri, Duncan, OK (US); D. Chad Brennels, Marlow, OK (US); Bobby J. King, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 359 days.

(21) Appl. No.: 12/183,599

(22) Filed: Jul. 31, 2008

(65) Prior Publication Data

US 2010/0025040 A1 Feb. 4, 2010

(51) Int. Cl.
  *E21B 33/13* (2006.01)
(52) U.S. Cl. ........................................ 166/294; 166/285
(58) Field of Classification Search .................. None
  See application file for complete search history.

(56) References Cited

U.S. PATENT DOCUMENTS

| | | | |
|---|---|---|---|
| 2,805,719 A | 9/1957 | Anderson |
| 3,422,011 A | 1/1969 | Jackovitz et al. |
| 3,926,650 A | 12/1975 | Lange et al. |
| 4,486,195 A | 12/1984 | Weinstein et al. |
| 4,676,835 A | 6/1987 | Green et al. |
| 5,071,484 A | 12/1991 | Bonifay et al. |
| 5,125,455 A | 6/1992 | Harris et al. |
| 5,133,409 A | 7/1992 | Bour et al. |
| 5,147,565 A | 9/1992 | Bour et al. |
| 5,240,639 A | 8/1993 | Diez et al. |
| 5,484,019 A | 1/1996 | Griffith |
| 5,569,324 A | 10/1996 | Tottel et al. |
| 5,580,378 A | 12/1996 | Shulman |
| 5,588,489 A | 12/1996 | Chatterji et al. |
| 5,686,024 A | 11/1997 | Dahanayake et al. |
| 5,696,059 A | 12/1997 | Onan et al. |
| 5,711,801 A | 1/1998 | Chatterji et al. |
| 5,806,594 A | 9/1998 | Stiles et al. |
| 5,897,699 A | 4/1999 | Chatterji et al. |
| 5,900,053 A | 5/1999 | Brothers et al. |
| 6,063,738 A | 5/2000 | Chatterji et al. |
| 6,145,591 A | 11/2000 | Boncan et al. |
| 6,210,476 B1 | 4/2001 | Chatterji et al. |
| 6,227,294 B1 | 5/2001 | Chatterji et al. |
| 6,273,191 B1 | 8/2001 | Reddy et al. |
| 6,297,202 B1 | 10/2001 | Chatterji et al. |
| 6,367,550 B1 | 4/2002 | Chatterji et al. |
| 6,417,142 B1 | 7/2002 | Chatterji et al. |
| 6,454,004 B2 | 9/2002 | Reddy et al. |
| 6,457,524 B1 | 10/2002 | Roddy |
| 6,488,763 B2 | 12/2002 | Brothers et al. |
| 6,500,252 B1 | 12/2002 | Chatterji et al. |
| 6,516,883 B1 * | 2/2003 | Chatterji et al. ............. 166/293 |
| 6,547,871 B2 | 4/2003 | Chatterji et al. |
| 6,619,399 B1 | 9/2003 | Chatterji et al. |
| 6,630,021 B2 | 10/2003 | Reddy et al. |
| 6,668,927 B1 | 12/2003 | Chatterji et al. |
| 6,722,433 B2 | 4/2004 | Brothers et al. |
| 6,767,867 B2 | 7/2004 | Chatterji et al. |
| 6,793,730 B2 | 9/2004 | Reddy et al. |
| 6,797,054 B2 | 9/2004 | Chatterji et al. |
| 6,829,922 B2 | 12/2004 | Patin et al. |
| 6,852,676 B1 | 2/2005 | Chatterji et al. |
| 6,899,177 B2 | 5/2005 | Chatterj et al. |
| 6,951,249 B1 | 10/2005 | Chatterji et al. |
| 6,978,834 B1 | 12/2005 | Chatterji et al. |
| 6,979,366 B2 | 12/2005 | Chatterji et al. |
| 6,982,000 B2 | 1/2006 | Chatterji et al. |
| 7,008,477 B2 | 3/2006 | Chatterji et al. |
| 7,008,479 B2 | 3/2006 | Chatterji et al. |
| 7,013,975 B2 | 3/2006 | Chatterji et al. |
| 7,040,419 B2 | 5/2006 | Chatterji et al. |
| 7,066,284 B2 | 6/2006 | Wylie et al. |
| 7,077,203 B1 | 7/2006 | Roddy et al. |
| 7,087,556 B2 | 8/2006 | Chen et al. |
| 7,093,658 B2 | 8/2006 | Chatterji et al. |
| 7,134,497 B1 | 11/2006 | Chatterji et al. |
| 7,143,827 B2 | 12/2006 | Chatterji et al. |
| 7,174,961 B2 | 2/2007 | Chatterji et al. |
| 7,191,834 B2 * | 3/2007 | Lewis et al. ................. 166/293 |
| 7,204,307 B2 | 4/2007 | Roddy et al. |
| 7,213,647 B2 | 5/2007 | Brothers et al. |
| 7,225,879 B2 | 6/2007 | Wylie et al. |
| 7,255,170 B2 | 8/2007 | Chatterji et al. |
| 7,287,594 B1 | 10/2007 | Chatterji et al. |
| 7,308,938 B1 | 12/2007 | Chatterji et al. |

(Continued)

OTHER PUBLICATIONS

Halliburton brochure entitled "Halad-344 Fluid Loss Additive" Aug. 2007.

(Continued)

*Primary Examiner*—Zakiya W Bates
*Assistant Examiner*—Angela M Ditrani
(74) *Attorney, Agent, or Firm*—Craig W. Roddy; Tumey L.L.P.

(57) ABSTRACT

A variety of methods and compositions are disclosed, including, in one embodiment, a cement composition comprising: cement; a surfactant composition comprising: an ethoxylated alcohol ether sulfate in an amount in the range of about 60 to about 64 parts by weight, a first alkyl or alkene amidopropyl betaine in an amount in the range of about 30 to about 33 parts by weight, and a second alkyl or alkene amidopropyl betaine in an amount in the range of about 1 to about 5 parts by weight; a gas; and water.

20 Claims, No Drawings

U.S. PATENT DOCUMENTS

| | | |
|---|---|---|
| 7,335,252 B2 | 2/2008 | Roddy et al. |
| 7,337,842 B2 | 3/2008 | Roddy et al. |
| 7,341,117 B2 | 3/2008 | Wylie et al. |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,393,814 B2 | 7/2008 | Chatterji et al. |
| 7,395,860 B2 | 7/2008 | Roddy et al. |
| 7,407,916 B2 | 8/2008 | Chatterji et al. |
| 2007/0101905 A1 | 5/2007 | Chatterji et al. |
| 2007/0105995 A1 | 5/2007 | Chatterji et al. |
| 2008/0156491 A1 | 7/2008 | Roddy et al. |

OTHER PUBLICATIONS

Halliburton brochure entitled "Halad-766 Fluid Loss Additive" Sep. 2006.

SPE25181, Surfactants: Additives to Improve the Performance properties of Cements, K.M. Cowan, Shell Development Co., and Larry Eoff, Halliburton Services, Society of Petroleum Engineers, Inc., pp. 317-327, 1983.

* cited by examiner

FOAMED CEMENT COMPOSITIONS, ADDITIVES, AND ASSOCIATED METHODS

BACKGROUND

The present invention relates to foamed cement compositions and, more particularly, in certain embodiments, to a surfactant composition for foaming and stabilizing foamed cement compositions and associated methods.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Cement compositions utilized in subterranean operations may be lightweight to prevent excessive hydrostatic pressure from being exerted on subterranean formations penetrated by the well bore, whereby the formations may be unintentionally fractured. One type of lightweight cement composition is a foamed cement composition, which may be formed by stabilizing a gas within a cement composition. In addition to being lightweight, the gas contained in the foamed cement composition should improve the ability of the composition to maintain pressure and prevent the flow of formation fluids into and through the cement composition during its transition time, i.e., the time during which the cement composition changes from a true fluid to a set mass. Foamed cement compositions may also be advantageous because they should have low fluid loss properties and may act to prevent the loss of fluid circulation. Additionally, foamed cement compositions when set should have a lower modulus of elasticity than non-foamed cements, which may be desirable as it should enable the resultant set cement, inter alia, to resist hoop stresses exerted on the set cement in the annulus.

A foamed cement composition generally may be prepared by mixing a gas, such as air or nitrogen, with the cement composition. Foamed cement composition typically further may comprise a variety of surfactant compositions for foaming and stabilizing the cement composition, in that the surfactant compositions may facilitate the foaming of a cement composition and/or prevent the components of the foamed cement composition from prematurely separating. While a variety of surfactant compositions are well known in the art, problems have been associated with their use. For example, some surfactant compositions, such as surfactant compositions with a cocamidopropyl amine oxide surfactant, may have undesirable environmental characteristics and/or may be limited by strict environmental regulations in certain areas of the world. By way of further example, some surfactant compositions may use isopropyl alcohol as a surfactant solubilizer, resulting in a flammable label for transportation purposes.

SUMMARY

The present invention relates to foamed cement compositions and, more particularly, in certain embodiments, to a surfactant composition for foaming and stabilizing foamed cement compositions and associated methods.

In one embodiment the present invention comprises a method of cementing comprising introducing a foamed cement composition into a well bore, wherein the foamed cement composition comprises cement, a surfactant composition, gas, and water, wherein the surfactant composition comprises: an ethoxylated alcohol ether sulfate of the formula $H(CH_2)_a(OC_2H_4)_bOSO_3NH_4^+$, wherein a is an integer in the range of about 6 to about 10 and b is an integer in the range of about 3 to about 10, the ethoxylated alcohol ether present in the surfactant composition in an amount in the range of about 60 to about 64 parts by weight, a first alkyl or alkene amidopropyl betaine of the formula $R—CONHCH_2CH_2CH_2N^+(CH_3)_2CH_2CO_2^-$, wherein R is a radical selected from the group consisting of decyl, cocoyl, lauryl, cetyl, and oleyl, the first alkyl or alkene amidopropyl betaine present in the surfactant composition in an amount in the range of about 30 to about 33 parts by weight, and a second alkyl or alkene amidopropyl betaine of the formula $R—CONHCH_2CH_2CH_2N^+(CH_3)_2CH_2CO_2^-$, wherein R is a $C_8$-$C_{18}$ radical, the second alkyl or alkene amidopropyl betaine present in the surfactant composition in an amount in the range of about 1 to about 5 parts by weight; and allowing the foamed cement composition to set.

In another embodiment, the present invention comprises a method of reducing density of a cement composition comprising: adding a surfactant composition to the cement composition that comprises cement and water, wherein the surfactant composition comprises: an ethoxylated alcohol ether sulfate of the formula $H(CH_2)_a(OC_2H_4)_bOSO_3NH_4^+$, wherein a is an integer in the range of about 6 to about 10 and b is an integer in the range of about 3 to about 10, the ethoxylated alcohol ether present in the surfactant composition in an amount in the range of about 60 to about 64 parts by weight, a first alkyl or alkene amidopropyl betaine of the formula $R—CONHCH_2CH_2CH_2N^+(CH_3)_2CH_2CO_2^-$, wherein R is a radical selected from the group consisting of decyl, cocoyl, lauryl, cetyl, and oleyl, the first alkyl or alkene amidopropyl betaine present in the surfactant composition in an amount in the range of about 30 to about 33 parts by weight, and a second alkyl or alkene amidopropyl betaine of the formula $R—CONHCH_2CH_2CH_2N^+(CH_3)_2CH_2CO_2^-$, wherein R is a $C_8$-$C_{18}$ radical, the second alkyl or alkene amidopropyl betaine present in the surfactant composition in an amount in the range of about 1 to about 5 parts by weight; and adding a gas to the cement composition.

In another embodiment the present invention comprising a cement composition comprising: cement; a surfactant composition comprising: an ethoxylated alcohol ether sulfate of the formula $H(CH_2)_a(OC_2H_4)_bOSO_3NH_4^+$, wherein a is an integer in the range of about 6 to about 10 and b is an integer in the range of about 3 to about 10, the ethoxylated alcohol ether present in the surfactant composition in an amount in the range of about 60 to about 64 parts by weight, a first alkyl or alkene amidopropyl betaine of the formula $R—CONHCH_2CH_2CH_2N^+(CH_3)_2CH_2CO_2^-$, wherein R is a radical selected from the group consisting of decyl, cocoyl, lauryl, cetyl, and oleyl, the first alkyl or alkene amidopropyl betaine present in the surfactant composition in an amount in the range of about 30 to about 33 parts by weight, and a second alkyl or alkene amidopropyl betaine of the formula R—CONHCH$_2$CH$_2$CH$_2$N$^+$(CH$_3$)$_2$CH$_2$CO$_2^-$, wherein R is a C$_8$-C$_{18}$ radical, the second alkyl amidopropyl betaine present in the surfactant composition in an amount in the range of about 1 to about 5 parts by weight; an ethoxylated alcohol ether sulfate, an alkyl or alkene amidopropyl betaine, and an alkyl or alkene amidopropyl-N,N dimethyl carboxymethyl betaine; a gas; and water.

In another embodiment, the present invention comprises a surfactant composition for foaming and stabilizing a cement composition comprising: an ethoxylated alcohol ether sulfate of the formula H(CH$_2$)$_a$(OC$_2$H$_4$)$_b$OSO$_3$NH$_4^+$, wherein a is an integer in the range of about 6 to about 10 and b is an integer in the range of about 3 to about 10, the ethoxylated alcohol ether present in the surfactant composition in an amount in the range of about 60 to about 64 parts by weight, a first alkyl or alkene amidopropyl betaine of the formula, R—CONHCH$_2$CH$_2$CH$_2$N$^+$(CH$_3$)$_2$CH$_2$CO$_2^-$, wherein R is a radical selected from the group consisting of decyl, cocoyl, lauryl, cetyl, and oleyl, the first alkyl or alkene amidopropyl betaine present in the surfactant composition in an amount in the range of about 30 to about 33 parts by weight, and a second alkyl or alkene amidopropyl betaine of the formula R—CONHCH$_2$CH$_2$CH$_2$N$^+$(CH$_3$)$_2$CH$_2$CO$_2^-$, wherein R is a C$_8$-C$_{18}$ radical, the second alkyl or alkene amidopropyl betaine present in the surfactant composition in an amount in the range of about 1 to about 5 parts by weight.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to foamed cement compositions and, more particularly, in certain embodiments, to a surfactant composition for foaming and stabilizing foamed cement compositions and associated methods. There may be several potential advantages to the methods and compositions of the present invention, only some of which may be alluded to herein. One of the many potential advantages of the methods and compositions of the present invention may be that the embodiments of the surfactant compositions have replaced amine oxide with an amidopropyl betaine, such that the surfactant composition may, inter alia, be less toxic to aquatic life and/or be less restricted by environmental regulations than other surfactant compositions. Another potential advantage of the methods and compositions of the present invention may be that embodiments of the surfactant compositions use hexylene glycol rather than isopropyl alcohol as a surfactant solubilizer, such that the surfactant compositions may not require a flammable label for transportation.

An example of a foamed cement composition of the present invention generally may comprise cement, a surfactant composition, a gas, and water. Generally, the foamed cement compositions of the present invention may have a density sufficient for a particular application as desired by one of ordinary skill in the art. In some embodiments, the foamed cement compositions of the present invention have a density in the range of about 8 pounds per gallon ("lb/gal") to about 16 lb/gal. In certain embodiments, the foamed cement compositions of the present invention may have a density in the range of about 8 lb/gal to about 13 lb/gal.

Any cement suitable for use in subterranean applications may be suitable for use in the present invention. In certain embodiments, the foamed cement compositions of the present invention comprise a hydraulic cement. A variety of hydraulic cements may be suitable for use, including those comprising calcium, aluminum, silicon, oxygen, and/or sulfur, which set and harden by reaction with water. Such hydraulic cements include, but are not limited to, Portland cements, pozzolanic cements, gypsum cements, calcium phosphate cements, high alumina content cements, silica cements, slag cements, and mixtures thereof. Portland cements that may be suitable for use in the present invention include those classified as Classes A, C, H, and G cements, according to American Petroleum Institute, API Specification for Materials and Testing for Well Cements, API Specification 10, Fifth Ed., Jul. 1, 1990.

Embodiments of the foamed cement compositions of the present invention also may include a surfactant composition for foaming and stabilizing the foamed cement composition. Generally, the surfactant composition may be present in the foamed cement compositions in a sufficient amount to foam and stabilize a foamed cement composition of the present invention. In some embodiments, the surfactant composition may be present in the foamed cement compositions in an amount in the range of about 0.5% to about 5% by volume of the water ("bvow") therein. In certain embodiments, the surfactant composition of the present invention may be present in the foamed cement compositions in an amount in the range of about 0.8% to about 2% bvow therein.

In accordance with embodiments of the present invention, the surfactant composition may comprise an ethoxylated alcohol ether sulfate, a first alkyl or alkene amidopropyl betaine, and a second alkyl or alkene amidopropyl betaine. In certain embodiments, the surfactant composition is essentially free of an amine oxide, in that the surfactant composition comprises an amine oxide, if any, in an amount less than about 0.01% by weight. The ethoxylated alcohol ether sulfate in the surfactant composition of the present invention may be any ethoxylated alcohol ether sulfate of the formula:

$$H(CH_2)_a(OC_2H_4)_bOSO_3NH_4^+$$

wherein a is an integer in the range of about 6 to about 10, and b is an integer in the range of about 3 to about 10. Those of ordinary skill in the art with the benefit of this disclosure will recognize that the ethoxylated alcohol ether sulfate may be a blend of a single ether sulfate molecule or different ether sulfate molecules of the above formula. Where present, the ethoxylated alcohol ether sulfate may be present in the surfactant composition in an amount in the range of about 60 to about 64 parts by weight. In certain embodiments, the ethoxylated alcohol ether sulfate may be present in the surfactant composition in an amount of about 63.33 parts by weight of the surfactant composition.

The first alkyl or alkene amidopropyl betaine in embodiments of the surfactant composition of the present invention may be any alkyl or alkene amidopropyl betaine of the formula:

wherein R is a radical selected from the group consisting of decyl, cocoyl, lauryl, cetyl, and oleyl. Those of ordinary skill in the art with the benefit of this disclosure will recognize that the first alkyl or alkene amidopropyl betaine may be a single amidopropyl betaine molecule or a blend of different amidopropyl betaine molecules of the above formula. Where present, the first alkyl or alkene amidopropyl betaine may be present in the surfactant composition in an amount in the range of about 30 to about 33 parts by weight. In certain embodiments, the first alkyl or alkene amidopropyl betaine may be present in the surfactant composition in an amount of about 31.67 parts by weight of the surfactant composition. In certain embodiments, the first alkyl or alkene amidopropyl betaine may include cocamidopropyl betaine.

The second alkyl or alkene amidopropyl betaine in embodiments of the surfactant composition of the present invention may be any alkyl or alkene amidopropyl-N,N dimethyl carboxymethyl betaine of the formula:

wherein R is a $C_8$-$C_{18}$ radical. Those of ordinary skill in the art with the benefit of this disclosure will recognize that the second alkyl or alkene amidopropyl betaine may be a single amidopropyl betaine molecule or a blend of different amidopropyl betaine molecules of the above formula. For example, in one embodiment, the second alkyl or alkene amidopropyl betaine may be a blend comprising: about 5% of an amidopropyl betaine molecule comprising a $C_8$ radical, about 5% of an amidopropyl betaine molecule comprising a $C_{10}$ radical, about 50% of an amidopropyl betaine molecule comprising a $C_{12}$ radical, about 20% of an amidopropyl betaine molecule comprising a $C_{14}$ radical, about 10% of an amidopropyl betaine molecule comprising a $C_{16}$ radical, and about 10% of an amidopropyl betaine molecule comprising a $C_{18}$ radical. In some embodiments, the second alkyl or alkene amidopropyl betaine may also comprise an amidopropyl betaine molecule comprising a $C_6$ radical in amounts less than 1%. Where present, the second alkyl or alkene amidopropyl betaine may be present in the surfactant composition in an amount in the range of about 1 to about 5 parts by weight. In certain embodiments, the second alkyl or alkene amidopropyl betaine may be present in the surfactant composition in an amount of about 5 parts by weight of the surfactant composition. In certain embodiments, the second alkyl or alkene amidopropyl betaine may be an octyl to oleyl amidopropyl betaine.

To facilitate mixing with the other components of the foamed cement composition, embodiments of the surfactant compositions of the present invention may further comprise a base fluid. The base fluid may include any suitable surfactant solubilizer, such as hexylene glycol, ethylene glycol monobutyl ether, diethylene glycol, sodium chloride solution, isopropyl alcohol and mixtures thereof. In certain embodiments, the base fluid may generally be present in the surfactant composition in an amount in the range of about 10 to about 30 parts by weight of the surfactant composition. In certain embodiments, the surfactant composition may comprise hexylene glycol in an amount in the range of about 5 to about 10 parts by weight. In certain embodiments, the hexylene glycol may be present in the surfactant composition in an amount of about 7 parts by weight of the surfactant composition The gas utilized in embodiments of the foamed cement compositions of the present invention may be any gas suitable for foaming a cement composition, including, but not limited to, air, nitrogen, or mixtures thereof. Generally, the gas should be present in embodiments of the foamed cement compositions of the present invention in an amount sufficient to form a foam. In certain embodiments, the gas may be present in the foamed cement compositions of the present invention in an amount in the range of about 5% to about 80% by volume of the foamed cement composition therein at atmospheric pressure. In another embodiment, the gas may be present in the foamed cement compositions of the present invention in an amount in the range of about 15% to about 60% by volume of the foamed cement composition therein at atmospheric pressure.

The water utilized in embodiments of the foamed cement compositions of the present invention may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. In certain embodiments, the water is present in the foamed cement composition in an amount in the range of about 30% to about 180% by weight of the cement ("bwoc") therein. In certain embodiments, the water is present in the cement composition in the range of about 40% to about 90% bwoc. In certain embodiments, the water is present in the cement composition in the range of about 40% to about 60% bwoc. One of ordinary skill in the art with the benefit of this disclosure will recognize the appropriate amount of water for a chosen application.

Optionally, other additional additives may be added to the foamed cement compositions of the present invention as deemed appropriate by one skilled in the art, with the benefit of this disclosure. Examples of such additives include, but are not limited to, weight reducing additives, heavyweight additives, lost circulation materials, filtration control additives, dispersants, suspending agents, and combinations thereof. Suitable examples of these additives include crystalline silica compounds, amorphous silica, salts, fibers, hydratable clays, microspheres, pozzolan additives, latex cement, thixotropic additives, combinations thereof and the like.

Embodiments the foamed cement compositions of the present invention may be prepared in accordance with any suitable technique. In some embodiments, the desired quantity of water may be introduced into a cement blender followed by the cement. Additional liquid additives, if any, may be added to the water as desired prior to addition of the cement, and additional solid additives, if any, may be added to the water and cement, as desired, prior to mixing. This mixture may agitated for a sufficient period of time to form a pumpable non-foamed slurry. This non-foamed slurry may then be pumped to the well bore, and a surfactant composition may be metered into the non-foamed slurry followed by injection of a gas, e.g., at a foaming mixing "T," in an amount sufficient to foam the slurry thereby forming a foamed cement composition, in accordance with one embodiment of the present invention. After foaming, the foamed cement composition may be placed into a desired location within the well bore and allowed to set therein. As will be appreciate by those of ordinary skill in the art, with the benefit of this disclosure, other suitable techniques for preparing foamed cement compositions may be used in accordance with embodiments of the present invention.

As set forth above, a cement composition may be foamed, for example, to reduce its density and thereby to reduce the exertion of pressure on the subterranean formation. An example of a method of a present invention may include a method of reducing the density of a cement composition. The method may comprise: adding a surfactant composition to a cement composition that comprises cement and water, the surfactant composition comprising an ethoxylated alcohol ether sulfate, a first alkyl or alkene amidopropyl betaine, and a second alkyl or alkene amidopropyl betaine; and adding a gas to the cement composition.

As will be appreciated by those of ordinary skill in the art, with the benefit of this disclosure, embodiments of the foamed cement compositions of the present invention may be used in a variety of subterranean applications, including, but not limited to, primary cementing and remedial cementing. For example, in primary cementing applications, the foamed cement compositions may be introduced into an annulus between a pipe string located in a subterranean formation and the subterranean formation and allowed to set therein. In addition, in remedial cementing applications, the cement compositions may used, for example, in squeeze cementing operations or in the placement of cement plugs. Moreover, the cement compositions of the present invention also may be used in surface applications, such as construction cementing.

To facilitate a better understanding of the present invention, the following examples of certain aspects of some embodiments are given. In no way should the following examples be read to limit, or define, the entire scope of the invention.

Example 1

Test samples of foamed cement slurries comprised of Portland Class H cement, a surfactant composition, fresh water or saltwater, and air were prepared. For each test sample, an unfoamed cement slurry was first prepared utilizing a mixing device. Predetermined amounts of the resulting slurry were then placed in fixed volume blender jars adapted for receiving a stacked blade assembly. A surfactant composition in accordance with embodiments of the present invention was added to some of the test samples and a commercially available surfactant composition was added to the other samples, the surfactant compositions were added to the jars in amounts of 2% by volume of water.

The surfactant composition in accordance with embodiments of the present invention, designated as "ZS-X," comprised 63.33 parts by weight of C6-10 alcohol ether sulfate with 3-10 moles of ethylene oxide, 31.67 parts by weight of cocamidopropyl betaine, and 5 parts by weight of cocamidopropyl-N,N dimethyl carboxymethyl betaine. The commercially available surfactant composition, designated as ZONE-SEAL® 2000 chemical additive ("ZS-2000"), comprised 63.33 parts by weight of C6-10 alcohol ether sulfate with 3-10 moles of ethylene oxide, 31.67 parts by weight of cocamidopropyl betaine, and 5 parts by weight of cocamidopropyl amine oxide. After the addition of the surfactant composition to the test samples in the jars, the contents were mixed at high speed. The high speed mixing by the stacked blade assembly caused each slurry to be foamed with air. The densities of the non-foamed cement slurries, the densities of the foamed cement slurries, the quantities of surfactant composition with the cement slurries in order to obtain stable foams in 15 seconds or less and the quantities of salt (sodium chloride) added to the water used to form the cement slurries are set forth in Table I below.

The foamed test samples were allowed to set for 24 hours at 140° F. and atmospheric pressure after which they were subjected to compressive strength and thickening time tests conducted in accordance with the procedures set forth in the API Specification 10 mentioned above. In addition, sectional densities of the resultant set foamed test sample were taken, resulting in a top, middle, and bottom density. The results of the tests are also set forth in Table I below.

TABLE I

Foamed Portland Cement Slurries Formed With Various Surfactant Compositions

| Slurry No. | Surfactant Composition Used | Quantity of Water Used gal/sk | Quantity of Sodium Chloride in Water, % by wt. of water | Unfoamed Cement Slurry Density, lb/gal | Foam Density, lb/gal | Foamed Cement Slurry Density, lb/gal | Time Required to Form a Stable Foam, sec | 24 hr Compressive Strength at 140° F., psi | Cured Sample Density lb/gal | | |
|---|---|---|---|---|---|---|---|---|---|---|---|
| | | | | | | | | | Top | Mid | Bottom |
| 1 | ZS 2000 | 5.07 | 0 | 15.81 | 11.2 | 10.41 | 5 | 697 | 9.96 | 9.84 | 9.84 |
| 2 | ZS-X | 5.07 | 0 | 15.81 | 11.2 | 10.47 | 5 | 771 | 10.1 | 9.97 | 10 |
| 3 | ZS 2000 | 4.5 | 18 | 16.59 | 11.5 | 11.36 | 10 | 666 | 10.79 | 10.68 | 10.78 |
| 4 | ZS-X | 4.5 | 18 | 16.59 | 11.5 | 10.97 | 10 | 655 | 10.4 | 10.3 | 10.29 |
| 5 | ZS 2000 | 3.7 | 37 | 17.51 | 11.2 | 14.47 | 15 | 1222 | 13.73 | 13.64 | 13.8 |
| 6 | ZS-X | 3.7 | 37 | 17.51 | 11.2 | 13.71 | 15 | 1202 | 13.01 | 12.97 | 13.1 |

From Table I it can be seen that an embodiment of a surfactant composition of the present invention produced stable foamed cement slurries in the same time as the commercially available surfactant composition. Further, the compressive strengths of the set foamed cement slurries utilizing an embodiment of the surfactant composition of the present invention were similar to the compressive strengths of the set foamed cement slurries containing the commercially available surfactant composition.

Example 2

The procedure described in Example 1 was repeated except that instead of standard particle size Portland cement, an ultra-fine particle size Portland cement was utilized. The ultra-fine particle size cement which was used is commercially available from Halliburton Energy Services of Duncan, Okla. as "MICRO MATRIX™" hydraulic cement and it has an average particle size of about 7.5 microns. The results of these tests are given in Table II below.

TABLE II

Foamed Ultra-Fine Cement Slurries Formed With Various Surfactant Compositions

| Slurry No. | Surfactant Composition Used | Quantity of Water Used gal/sk | Quantity of Sodium Chloride in Water, % by wt. of water | Unfoamed Cement Slurry Density, lb/gal | Foam Density, lb/gal | Foamed Cement Slurry Density, lb/gal | Time Required to Form a Stable Foam, sec | 24 hr Compressive Strength at 140° F., psi | Cured Sample Density lb/gal | | |
|---|---|---|---|---|---|---|---|---|---|---|---|
| | | | | | | | | | Top | Mid | Bottom |
| 7 | ZS 2000 | 7.02 | 0 | 12.03 | 10 | 9.71 | 10 | 608 | 9.52 | 9.49 | 9.43 |
| 8 | ZS-X | 7.02 | 0 | 12.03 | 10 | 9.68 | 10 | 545 | 9.47 | 9.41 | 9.47 |
| 9 | ZS 2000 | 5.88 | 18 | 13.09 | 10 | 10.12 | 15 | 759 | 9.77 | 9.76 | 9.78 |
| 10 | ZS-X | 5.88 | 18 | 13.09 | 10 | 9.89 | 15 | 647 | 9.68 | 9.7 | 9.71 |
| 11 | ZS 2000 | 4.32 | 37 | 14.33 | 10 | 13.05 | 15 | 1626 | 12.94 | 12.95 | 12.97 |
| 12 | ZS-X | 4.32 | 37 | 14.33 | 10 | 12.64 | 15 | 1631 | 12.61 | 12.63 | 12.67 |

From Table II it can be seen that an embodiment of a surfactant composition of the present invention produced stable foamed cement slurries in the same time as the commercially available surfactant composition. Further, the compressive strengths of the set foamed cement slurries utilizing an embodiment of a surfactant composition of the present invention were similar to the compressive strengths of the set foamed cement slurries containing the commercially available surfactant composition.

Example 3

The tests and procedures described in Example 1 above were repeated except that slag cement was substituted for Portland cement. The results of these tests are set forth in Table III below.

TABLE III

Foamed Slag Cement Slurries Formed With Various Surfactant Compositions

| Slurry No. | Surfactant Composition Used | Quantity of Water Used gal/sk | Quantity of Sodium Chloride in Water, % by wt. of water | Unfoamed Cement Slurry Density, lb/gal | Foam Density, lb/gal | Foamed Cement Slurry Density, lb/gal | Time Required to Form a Stable Foam, sec | 24 hr Compressive Strength at 140° F., psi | Cured Sample Density lb/gal | | |
|---|---|---|---|---|---|---|---|---|---|---|---|
| | | | | | | | | | Top | Mid | Bottom |
| 13 | ZS 2000 | 5.3 | 0 | 15.04 | 12 | 11.74 | 10 | 336 | 11.48 | 11.47 | 11.5 |
| 14 | ZS-X | 5.3 | 0 | 15.04 | 12 | 11.69 | 10 | 294 | 11.66 | 11.63 | 11.63 |
| 15 | ZS 2000 | 4.7 | 18 | 15.8 | 12 | 13.17 | 15 | 393 | 13.02 | 12.97 | 13.1 |
| 16 | ZS-X | 4.7 | 18 | 15.8 | 12 | 12.97 | 15 | 381 | 12.81 | 12.78 | 12.83 |
| 17 | ZS 2000 | 3.8 | 37 | 16.7 | 12 | 13.92 | 15 | 455 | 13.74 | 13.76 | 13.84 |
| 18 | ZS-X | 3.8 | 37 | 16.7 | 12 | 13.98 | 15 | 422 | 13.92 | 13.93 | 14.04 |

From Table III it can be seen that an embodiment of a surfactant composition of the present invention produced stable foamed cement slurries in the same time as the commercially available surfactant composition. Further, the compressive strengths of the set foamed cement slurries utilizing an embodiment of a surfactant composition of the present invention were similar to the compressive strengths of the set foamed cement slurries containing the commercially available surfactant composition.

Example 4

The tests and procedures described in Example 1 above were repeated except that the surfactant compositions were added to a low temperature cement slurry comprised of standard particle size Portland Class A cement mixed with the ultra-fine particle size Portland cement described in Example 2 above in an amount of 18% ultra-fine cement by weight of the cement mixture, calcium chloride in an amount of 2% by weight of the cement mixture, a dry cement free flow additive present in an amount of 0.055% by weight of the cement mixture, and water in amounts sufficient to form cement slurries having the densities set forth in Table IV below and the foamed test samples were allowed to set for 72 hours at 45° F. The results of the tests are also set forth in Table IV below.

TABLE IV

Foamed Portland and Ultra-Fine Cement Slurries Formed With Various Surfactant Compositions

| Slurry No. | Surfactant Composition Used | Unfoamed Cement Slurry Density, lb/gal | Foam Density, lb/gal | Foamed Cement Slurry Density, lb/gal | Time Required to Form a Stable Foam, sec | 72 hr Compressive Strength at 45° F., psi | Cured Sample Density lb/gal | | |
|---|---|---|---|---|---|---|---|---|---|
| | | | | | | | Top | Mid | Bottom |
| 19 | ZS 2000 | 15.27 | 12 | 11.65 | 15 | 1007 | 11.94 | 11.88 | 11.94 |
| 20 | ZS-X | 15.27 | 12 | 11.63 | 15 | 951 | 12.11 | 12.08 | 12.09 |

From Table IV it can be seen that an embodiment of a surfactant composition of the present invention produced stable foamed cement slurries in the same time as the commercially available surfactant composition. Further, the compressive strengths of the set foamed cement slurries utilizing an embodiment of a surfactant composition of the present invention were similar to the compressive strengths of the set foamed cement slurries containing the commercially available surfactant composition.

Example 5

Foamed cement slurries comprising an embodiment of a surfactant composition of the present invention or a commercially available surfactant composition, a Class H cement, 0.3% of HALAD®-344 fluid loss additive, 0.2% of HALAD® fluid loss additive-766, and water in amounts sufficient to form cement slurries having the densities set forth in Table V below were tested for rheological properties in accordance with the procedures set forth in the above mentioned API Specification 10. The results of the tests are also set forth in Table V below. In addition, sectional densities of the resultant set foamed test sample were taken, resulting in a top, middle, and bottom density.

TABLE V

Foamed Portland Cement Slurries Formed With Various Surfactant Compositions

| Slurry No. | Surfactant Composition Used | Quantity of Surfactant Composition Used, % by vol. of water | Unfoamed Cement Slurry Density, lb/gal | Foam Density, lb/gal | Foamed Cement Slurry Density, lb/gal | Time Required to Form a Stable Foam, sec | 72 hr Compressive Strength at 140° F., psi | Cured Sample Density lb/gal | | |
|---|---|---|---|---|---|---|---|---|---|---|
| | | | | | | | | Top | Mid | Bottom |
| 21 | ZS 2000 | 1.5 | 16.4 | 10 | 11.18 | 15 | 389 | 10.88 | 10.71 | 10.76 |
| 22 | ZS-X | 1.5 | 16.4 | 10 | 11.02 | 15 | 401 | 10.85 | 10.67 | 10.76 |

From Table V it can be seen that an embodiment of a surfactant composition of the present invention produced stable foamed cement slurries in the same time as the commercially available surfactant composition. Further, the compressive strengths of the set foamed cement slurries utilizing an embodiment of a surfactant composition of the present invention were similar to the compressive strengths of the set foamed cement slurries containing the commercially available surfactant composition.

Example 6

Foamed cement slurries comprising an embodiment of a surfactant composition of the present invention or a commercially available surfactant composition, 47 pounds of a Class H cement, 37 pounds of a pozzolanic cement, 2% bentonite by weight of the cement, 0.2% of HALAD®-344 fluid loss additive by weight of the cement, 0.2% of HALAD®-766 fluid loss additive, 6 lb/sk of Gilsonite, and water in amounts sufficient to form cement slurries having the densities set forth in Table VI below were tested for Theological properties in accordance with the procedures set forth in the above mentioned API Specification 10. The results of the tests are also set forth in Table VI below. In addition, sectional densities of the resultant set foamed test sample were taken, resulting in a top, middle, and bottom density.

TABLE VI

Foamed Portland Cement Slurries Formed With Various Surfactant Compositions

| Slurry No. | Surfactant Composition Used | Quantity of Surfactant Composition Used, % by vol. of water | Unfoamed Cement Slurry Density, lb/gal | Foam Density, lb/gal | Foamed Cement Slurry Density, lb/gal | Time Required to Form a Stable Foam, sec | 72 hr Compressive Strength at 140° F., psi | Cured Sample Density lb/gal | | |
|---|---|---|---|---|---|---|---|---|---|---|
| | | | | | | | | Top | Mid | Bottom |
| 23 | ZS 2000 | 1.5 | 13.45 | 10 | 10.2 | 15 | 103.4 | 10.16 | 10.63 | 11.47 |
| 24 | ZS-X | 1.5 | 13.45 | 10 | 10.18 | 15 | 138.5 | 9.83 | 9.76 | 9.83 |

From Table VI it can be seen that a surfactant composition of the present invention produced stable foamed cement slurries in the same time as the commercially available surfactant composition. Further, the compressive strengths of the set foamed cement slurries utilizing a surfactant composition of the present invention were similar to the compressive strengths of the set foamed cement slurries containing the commercially available surfactant composition.

Example 7

Foamed cement slurries comprising a surfactant composition of the present invention or a commercially available surfactant composition, a Class H cement, 0.2% of HALAD®-344 fluid loss additive, 0.2% of HALAD®-766 fluid loss additive, 35% SSA-1, 6 lb/sk Gilsonite, and water in amounts sufficient to form cement slurries having the densities set forth in Table VII below were tested for rheological properties in accordance with the procedures set forth in the above mentioned API Specification 10. The results of the tests are also set forth in Table VII below the. In addition, sectional densities of the resultant set foamed test sample were taken, resulting in a top, middle, and bottom density.

TABLE VII

Foamed Portland Cement Slurries Formed With Various Surfactant compositions

| Slurry No. | Surfactant Composition Used | Quantity of Surfactant Composition Used, % by vol. of water | Unfoamed Cement Slurry Density, lb/gal | Foam Density, lb/gal | Foamed Cement Slurry Density, lb/gal | Time Required to Form a Stable Foam, sec | 72 hr Compressive Strength at 140° F., psi | Cured Sample Density lb/gal | | |
|---|---|---|---|---|---|---|---|---|---|---|
| | | | | | | | | Top | Mid | Bottom |
| 25 | ZS 2000 | 1.5 | 16 | 14 | 14.65 | 10 | 1349 | 14.25 | 14.21 | 14.31 |
| 26 | ZS-X | 1.5 | 16 | 14 | 14.39 | 10 | 1235 | 14.08 | 13.96 | 14.04 |

From Table VII it can be seen that an embodiment of a surfactant composition of the present invention produced stable foamed cement slurries in the same time the commercially available surfactant composition. Further, the compressive strengths of the set foamed cement slurries utilizing an embodiment of a surfactant composition of the present invention were similar to the compressive strengths of the set foamed cement slurries containing the commercially available surfactant composition.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing comprising:
    introducing a foamed cement composition into a well bore, wherein the foamed cement composition comprises cement, a surfactant composition, gas, and water, wherein the surfactant composition comprises:
    an ethoxylated alcohol ether sulfate of the formula $H(CH_2)_a(OC_2H_4)_bOSO_3NH_4^+$ wherein a is an integer in the range of about 6 to about 10 and b is an integer in the range of about 3 to about 10, the ethoxylated alcohol ether present in the surfactant composition in an amount in the range of about 60 to about 64 parts by weight,
    a first alkyl or alkene amidopropyl betaine of the formula

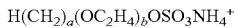
    R—CONHCH$_2$CH$_2$CH$_2$N$^+$(CH$_3$)$_2$CH$_2$CO$_2^-$ wherein R is a radical selected from the group consisting of decyl, cocoyl, lauryl, cetyl, and oleyl, the first alkyl or alkene amidopropyl betaine present in the surfactant composition in an amount in the range of about 30 to about 33 parts by weight, and
    a second alkyl or alkene amidopropyl betaine of the formula

    R—CONHCH$_2$CH$_2$CH$_2$N$^+$(CH$_3$)$_2$CH$_2$CO$_2^-$ wherein R is a C$_8$-C$_{18}$ radical, the second alkyl or alkene amidopropyl betaine present in the surfactant composition in an amount in the range of about 1 to about 5 parts by weight; and
    allowing the foamed cement composition to set.

2. The method of claim 1 wherein the surfactant composition is essentially free of an amine oxide.
3. The method of claim 1 wherein the ethoxylated alcohol ether sulfate is present in the surfactant composition in an amount of about 63.33 parts by weight of the surfactant composition, the first alkyl or alkene amidopropyl betaine is present in the surfactant composition in an amount of about 31.67 parts by weight of the surfactant composition, and the second alkyl or alkene amidopropyl betaine is present in the surfactant composition in an amount of about 5 parts by weight of the surfactant composition.
4. The method of claim 1 wherein the surfactant composition is present in the foamed cement composition in an amount in the range of about 0.5% to about 5% by volume of the water therein.
5. The method of claim 1 wherein the surfactant composition further comprises hexylene glycol.
6. The method of claim 1 wherein the gas is present in the foamed cement composition in an amount in the range of about 5% to about 80% by volume of the foamed cement composition.
7. The method of claim 1 wherein the first alkyl or alkene amidopropyl betaine comprises cocamidopropyl betaine.
8. The method of claim 1 wherein the foamed cement composition has a density of about 8 pounds per gallon to about 13 pounds per gallons.
9. The method of claim 1 wherein the cement comprises at least one hydraulic cement selected from the group consisting of Portland cement, a pozzolanic cement, a gypsum cement, a calcium phosphate cement, a high alumina content cement, a silica cement, a slag cement, and any combination thereof.
10. The method of claim 1 wherein the second alkyl or alkene amidopropyl betaine comprises an octyl to oleyl amidopropyl betaine.
11. The method of claim 1 wherein the surfactant composition further comprises a base fluid in an amount of about 10 to about 30 parts by weight of the surfactant composition.
12. The method of claim 1 wherein the foamed cement composition further comprises at least one additive selected from the group consisting of a weight reducing additive, a heavyweight additive, a lost circulation material, a filtration control additive, a dispersant, a suspending agent, and any combination thereof.
13. The method of claim 1 wherein the foamed cement composition further comprises at least one additive selected from the group consisting of a crystalline silica compound, amorphous silica, salt, fiber, hydratable clay, a microsphere, a pozzolan additive, a latex cement, a thixotropic additives, and any combination thereof.
14. The method of claim 1 wherein foamed cement composition is allowed to set in an annulus between a wall of the well bore and a pipe string located in the well bore.
15. A method of cementing comprising:
    introducing a foamed cement composition into a well bore, wherein the foamed cement composition comprises hydraulic cement, a surfactant composition, gas, and water, wherein the surfactant composition comprises:
    an ethoxylated alcohol ether sulfate of the formula $H(CH_2)_a(OC_2H_4)_bOSO_3NH_4^+$ wherein a is an integer in the range of about 6 to about 10 and b is an integer in the range of about 3 to about 10,
    a first alkyl or alkene amidopropyl betaine of the formula

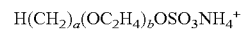
    R—CONHCH$_2$CH$_2$CH$_2$N$^+$(CH$_3$)$_2$CH$_2$CO$_2^-$ wherein R is a radical selected from the group consisting of decyl, cocoyl, lauryl, cetyl, and oleyl, and a second alkyl or alkene amidopropyl betaine of the formula

R—CONHCH$_2$CH$_2$CH$_2$N$^+$(CH$_3$)$_2$CH$_2$CO$_2^-$ wherein R is a C$_8$-C$_{18}$ radical; and allowing the foamed cement composition to set.

16. The method of claim 15 wherein the surfactant composition is essentially free of an amine oxide.

17. The method of claim 15 wherein the ethoxylated alcohol ether sulfate is present in the surfactant composition in an amount of about 60 to about 64 parts by weight of the surfactant composition, the first alkyl or alkene amidopropyl betaine is present in the surfactant composition in an amount of about 30 to about 33 parts by weight of the surfactant composition, and the second alkyl or alkene amidopropyl betaine is present in the surfactant composition in an amount of about 1 to about 5 parts by weight of the surfactant composition.

18. The method of claim 15 wherein the surfactant composition is present in the foamed cement composition in an amount in the range of about 0.5% to about 5% by volume of the water therein.

19. The method of claim 15 wherein the first alkyl or alkene amidopropyl betaine comprises cocamidopropyl betaine, and wherein the second alkyl or alkene amidopropyl betaine comprises an octyl to oleyl amidopropyl betaine.

20. A method of cementing comprising:

introducing a foamed cement composition into an annulus between a subterranean formation and a pipe string, wherein the foamed cement composition has a density of about 8 pounds per gallon to about 13 pounds per gallons, wherein the foamed cement composition comprises hydraulic cement, water, gas, and a surfactant composition in an amount of about 0.5% to about 5% by volume of the water, wherein the surfactant composition is essentially free of amine oxide and comprises:

an ethoxylated alcohol ether sulfate of the formula

H(CH$_2$)$_a$(OC$_2$H$_4$)$_b$OSO$_3$NH$_4^+$ wherein a is an integer in the range of about 6 to about 10 and b is an integer in the range of about 3 to about 10, the ethoxylated alcohol ether present in the surfactant composition in an amount in the range of about 60 to about 64 parts by weight of the surfactant composition, a cocamidopropyl betaine in an amount of about 30 to about 33 parts by weight of the surfactant composition, and an octyl to oleyl amidopropyl betaine in an amount of about 1 to about 5 parts by weight of the surfactant composition; and allowing the foamed cement composition to set.

* * * * *